Dec. 6, 1955  D. L. KRISTOFF  2,725,920
FILM SPLICER
Filed April 17, 1953  2 Sheets-Sheet 1
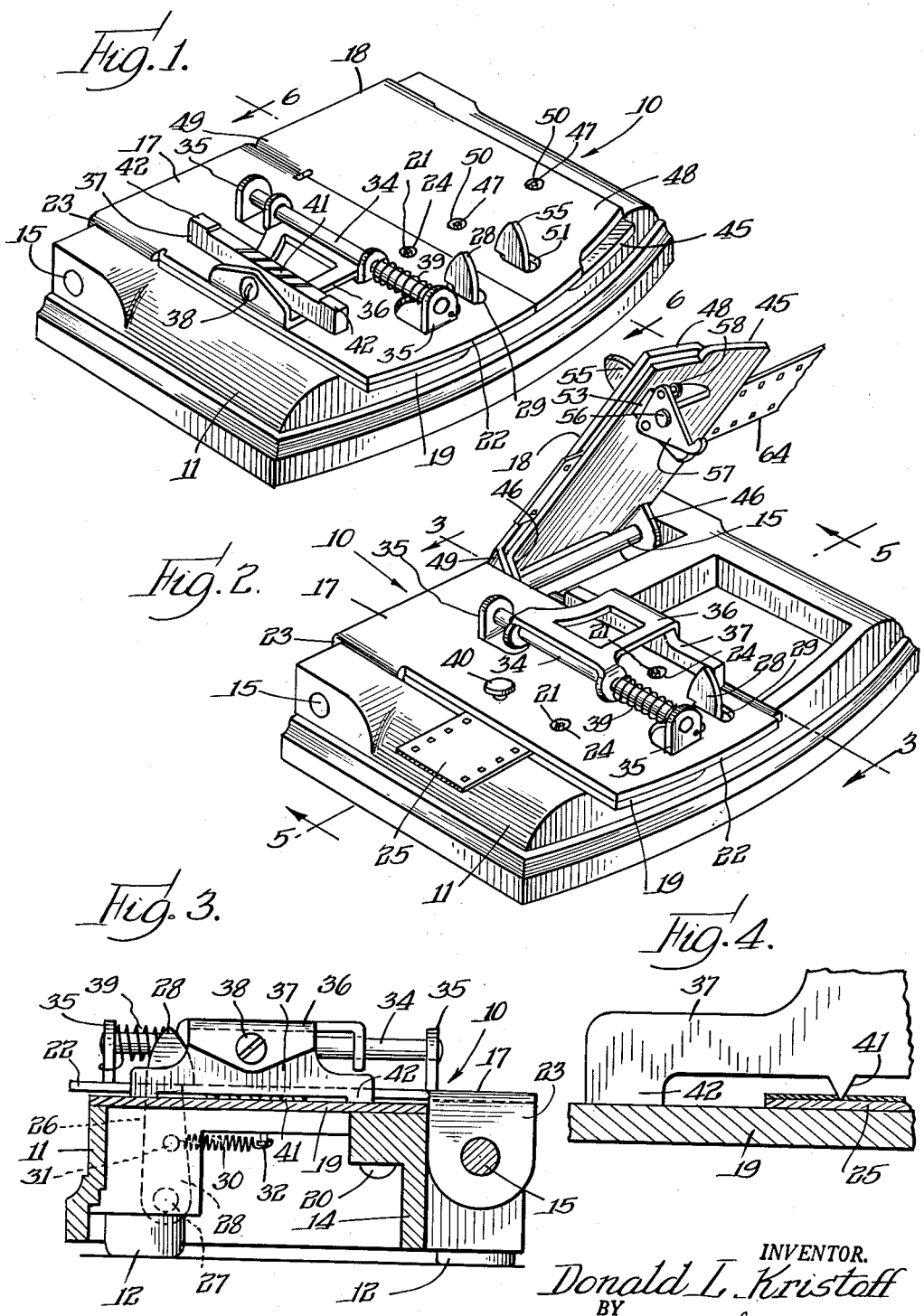
INVENTOR.
Donald L. Kristoff
BY
Wallenstein & Spangenberg
attys.

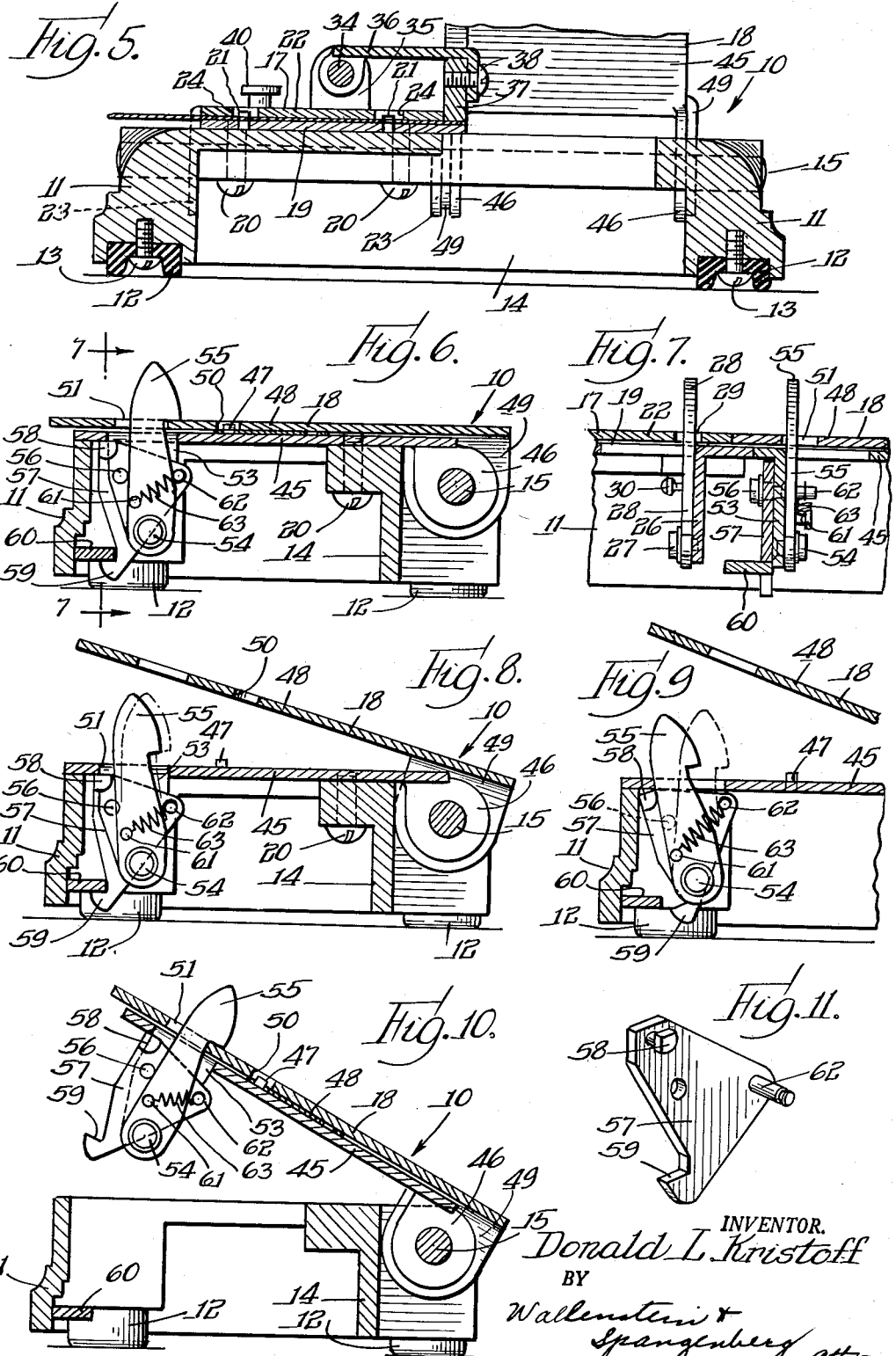

United States Patent Office 2,725,920
Patented Dec. 6, 1955

2,725,920

FILM SPLICER

Donald L. Kristoff, Chicago, Ill., assignor to James Heddon's Sons Corporation, Dowagiac, Mich., a corporation of Delaware Application April 17, 1953, Serial No. 349,459

13 Claims. (Cl. 154—42.1)

This invention relates to improvements in film splicers for splicing together the ends of two sections of films.

One object of this invention is to provide, in a film splicer, an improved scraping or abrading member for the purpose of removing the emulsion adjacent the edge of one section of film preparatory to carrying out the splicing operation wherein spacer means are provided for limiting the extent of scraping of the film to prevent the scraper from cutting through the film, thereby making the splice as mechanically strong as possible, and also for effectively preventing undue dulling of the scraper blades.

Another object of this invention is to provide, in a film splicer, an improved latch means for the film holding assemblies thereof wherein inappropriate manipulation thereof, with consequent breaking of the spliced joint, is prevented.

The features of this invention may be considered in relation to that type of film splicer which includes a base and a pair of adjacent film holding assemblies carried by the base, wherein the first film holding assembly includes a pivoted clamping plate and a stationary base plate extending beyond the clamping plate and clamping a film section therebetween, wherein the second film holding assembly includes a pivoted base plate and a pivoted clamping plate extending beyond the base plate and clamping another film section therebetween, wherein the extension of the pivoted clamping plate of the second film holding assembly overlies the extension of the stationary base plate of the first film holding assembly when the second film holding assembly is closed against the base, and wherein the extension of the stationary base plate of the first film holding assembly is exposed when the second film holding assembly is opened from the base.

Briefly, the film scraper of this invention is preferably slidably mounted on a support member carried by the pivoted clamping plate of the first film holding assembly and in scraping position it overlies the base plate extension thereof and is movable transverse to the film section held by the first film holding assembly. The film scraper includes a plurality of scraper blades for scraping the film and spacer means for engaging the base plate extension to space the scraper blades therefrom to prevent the scraper blades from cutting, scraping or abrading entirely through the film section. In this way an entirely fool proof scraping operation may be readily and surely accomplished, and a mechanically strong splice is assured. Also the spacer means prevents the scraper blades from engaging the base plate extension so that they cannot be dulled thereby. The spacer means may take the form of a pair of spacer feet at the ends of the film scraper. Also, the film scraper may be pivotally mounted as well as slidably mounted so that it may be readily swung into and out of scraping position.

Special latching means are provided for the second film holding assembly to prevent improper manipulation of the pivoted base plate and pivoted clamping plate thereof and breaking the spliced joint of the film sections. In this respect, a latch means is carried by the pivoted base plate for readily latching the pivoted clamping plate thereto for holding the film section therebetween, and a second latch means is also carried by the pivoted base plate for releasably latching the pivoted base plate to the base while forming the splice. Means are provided for interconnecting the two latch means to permit releasing of the pivoted base plate from the base only after the pivoted clamping plate has been released from the pivoted base plate. Thus it is impossible to open the pivoted base plate from the base while the pivoted clamping plate holds the film section against the pivoted base plate. Breaking or rupturing of the splice between the film sections by improper manipulation of the film holding assemblies is therefore entirely prevented.

Further objects of this invention reside in the details of construction of the film splicer including the film scraper and latch means and in the cooperative relationships between the component parts thereof.

Other objects and advantages of this invention will become apparent to those skilled in the art upon reference to the accompanying specification, claims and drawings in which:

Figure 1 is a perspective view of the film splicer with the film holding assemblies closed against the base and with the film scraper latched in inoperative position.

Figure 2 is a perspective view similar to Figure 1 but illustrating film sections held by the film holding assemblies and the parts in position for scraping one of the film sections.

Figure 3 is a vertical sectional view taken substantially along the line 3—3 of Figure 2 and illustrating the manner of scraping one of the film sections.

Figure 4 is an enlarged view of a portion of the film scraper as illustrated in Figure 3 but more clearly showing the scraping and abrading action.

Figure 5 is a vertical sectional view taken substantially along the line 5—5 of Figure 2.

Figure 6 is a vertical sectional view taken substantially along the line 6—6 of Figure 1 and illustrating the pivoted clamping plate and the pivoted base plate latched in closed position against the base.

Figure 7 is a vertical sectional view taken along the line 7—7 of Figure 6.

Figure 8 is a vertical sectional view similar to Figure 6 but illustrating the pivoted clamping plate released and in elevated position.

Figure 9 is a partial vertical sectional view similar to Figure 8 but showing the latch means operated for releasing the pivoted base plate from the base.

Figure 10 is a vertical sectional view similar to Figures 6, 8 and 9 but showing the pivoted clamping plate and the pivoted base plate latched together but released from the base.

Figure 11 is a perspective view of the latch member for latching the pivoted base plate to the base.

The film splicer incorporating the features of this invention is generally designated at 10. It includes a base 11 having front and end walls and an open back. Suitable supporting feet 12 preferably made of rubber or the like are secured to the base 11, such as by means of screws 13, for supporting the base. The base adjacent its open back is provided with a longitudinal rib 14 and outside of this rib a shaft 15 extends from one end of the base 11 to the other, the shaft being suitably secured in the base.

The film splicer 10 includes two film holding assemblies 17 and 18, respectively, for holding two sections of film which are to be spliced together. The first film holding assembly 17 includes a stationary base plate 19 which is secured to the base 11 by means of screws 20. This base plate 19 has a plurality of pins 21 extending upwardly therefrom which are received in the usual sprocket holes in the film section to be spliced, these pins 21 acting positively to locate the film section in proper place on the base plate 19 for splicing purposes. The film holding assembly 17 also includes a clamping plate 22 which is provided with a pair of ears 23 for pivotally mounting the same on the shaft 15. The clamping plate 22 is provided with a plurality of holes 24 for receiving the pins 21 and when the clamping plate 22 is latched against the base plate 19, a film section such as indicated at 25 is securely held in proper place in the film holding assembly 17. It is here noted that the stationary base plate 19 adjacent the second film holding assembly 18 extends beyond the clamping plate 22 for forming the working surface for the film scraper, this being illustrated in more detail in Figures 2 and 5.

An ear 26 is struck downwardly from the base plate 19 and carries at its lower end a pin 27 for pivotally mounting a latch member 28 which extends upwardly through a hole 29 in the clamping plate 22, the latch member 28 being provided with a latch shoulder engaging the outer surface of the clamping plate 22 for latching the same against the stationary base plate 19. The latch member 28, as illustrated in more detail in Figure 3, is provided with a pin 31 which is connected to one end of a spring 30. The other end of the spring 30 is connected to a pin 32 carried by the base 11 so that the spring 30 at all times resiliently urges the latch member 28 into latching position. The upper end of the latch member 28 is exposed so that it may be manually manipulated for releasing the pivoted clamping plate 22 from the stationary base plate 19. Thus, by manipulating the latch member 28 the clamping plate 22 may be readily opened and closed for the purpose of inserting and removing film sections 25 from the film holding assembly 17.

A supporting member in the form of a pin 34 is carried by ears 35 struck upwardly from the pivoted clamping plate 22. A bracket 36 is pivotally and slidably mounted on the support pin 34 and the outer end of this bracket 36 carries a film scraper 37 by means of a screw 38. A spring 39 around the support pin 34 is connected at its ends to one of the ears 35 and to the bracket 36. The spring operates at all times to urge the bracket 36 in a clockwise direction as illustrated in Figures 1, 2 and 5 and also in a direction away from the shaft 15. To retain the bracket 36 and, hence, the film scraper 37 in inoperative position as illustrated in Figure 1, an opening in the bracket 36 is hooked under a shoulder, such as for example the head of a pin 40, carried by the pivoted clamping plate 22, this hooked engagement being maintained by the spring 39. To release the bracket 36 and, hence, the film scraper 37 to allow the same to be moved to operative position as illustrated in Figures 2, 3 and 5 all that is necessary is to first slide the bracket 36 along the support pin 34 towards the shaft 15 for clearing the head of the pin 40. Thereupon the bracket 36 and, hence, the film scraper 37 is swung by the spring 39 to the operative position.

The film scraper 37 when in scraping position overlies the extension of the base plate 19 as shown in more detail in Figures 2, 3, 4 and 5. The film scraper 37 is provided with a plurality of obliquely arranged scraping blades 41 which contact the surface of the film section 25 which is held by the film holding assembly 17, the film section 25 being backed by the extension of the base plate 19. The film scraper 37 is thus arranged across the film section 25 and as the scraper is slid back and forth along the support pin 34 the scraper blades 41 scrape or abrade the emulsion from the film section 25. To prevent the scraper blades 41 from entirely scraping or abrading through the film section 25, the film scraper 37 is provided with spacer means which preferably take the form of a pair of spacer feet 42 at the ends of the film scraper. These spacer feet 42 engage the extension of the base plate 19 and operate positively to space the scraper blades 41 from the base plate extension. The spacer feet 42 preferably provide a clearance of substantially .003 to .004 inch between the edges of the scraper blades 41 and the extension of the base plate 19. Thus, it is only possible to scrape the film section down to this dimension and, therefore, it is impossible entirely to scrape through or abrade through the entire film section 25. Substantially only the emulsion is removed from the film section and substantially the full strength of the film section is retained. This provides for a strong splice which is made following the scraping operation.

The other or second film holding assembly 18 includes a pivoted base plate 45 which is provided with a pair of ears 46 for pivoting the same to the shaft 15. This pivoted base plate 45 is also provided with a plurality of pins 47 which are received in the usual sprocket holes of a film section such as designated at 64 for positively locating the film section with respect to the pivoted base plate 45. The film holding assembly 18 also includes a pivoted clamping plate 45 which is provided with a pair of ears 49 for pivoting the same to the shaft 15. The pivoted clamping plate 48 is provided with a plurality of holes 50 for receiving the pins 47 so that when the pivoted clamping plate 48 is latched against the base plate 45 the film section 64 is firmly held in place in proper position in the film holding assembly 18. The clamping plate 48 is also provided with a hole 51 for receiving a latch member 55. The pivoted clamping plate 48 extends beyond the pivoted base plate 45 and overlies the extension of the stationary base plate 19 when the film holding assembly 18 is closed as illustrated in Figures 1 and 7.

An ear 53 is struck downwardly from the pivoted base plate 45 and it carries at its lower end a pin 54 to which is pivotally mounted the latch member 55. The latch member 55 extends upwardly through the opening in the base plate 45 created by striking down the ear 53 and upwardly through the opening 51 in the pivoted clamping plate 48. The latch member 55 is provided with a latch shoulder for engaging over the outer face of the pivoted clamping plate 48 for latching the pivoted clamping plate 48 to the pivoted base plate 45. When the plates 45 and 48 are so latched together they operate firmly to hold the film section 64 in proper position as illustrated in Figure 2.

The downwardly extending ear 53 also carries a pivot pin 56 which in turn pivotally carries a latch member 57, the details of which are illustrated in Figure 11. The latch member 57 carries a pin 58 which is adapted to be engaged by the latch member 55 for moving the latch member 57. The latch member 57 is also provided with a latch shoulder 59 for engaging underneath a shoulder 60 carried by the base 11. Thus, when the latch shoulder 59 engages the latch shoulder 60 as shown in more detail in Figures 6 and 8, the pivoted base plate 45 is latched in closed position against the base 11. The latch member 55 carries a pin 61 and the latch member 57 carries a pin 62 and a spring 63 is connected between the pins 61 and 62. The spring 63 therefore operates resiliently to move the latch members 55 and 57 to latching positions.

With the parts in the position illustrated in Figure 10 the latch member 55 latches together the base plate 45 and the clamping plate 48 for firmly holding a film section therebetween. When the latched base plate and the clamping plate are closed against the base 11 as illustrated in Figure 6, the base plate 45 is latched by the latch member 57 against the base 11, the closing of the base plate 45 against the base 11 being permitted by movement of the latch member 57 against the action of the spring 63. In order to open the clamping plate 18 the latch member 55 as shown in Figure 6 is moved to the left against the edge of the hole 51 whereupon the clamping plate 18 may be opened as illustrated in Figure 8. However, during the opening of the clamping plate 18 it is impossible to open the base plate 45 since the opening 51 so limits the movement of the latch member 55 that it cannot engage the pin 58 of the latch member 57. Thus, only the clamping plate 18 may be opened at this time. The degree of this limited movement of the latching member 55 is illustrated in Figure 8 by the dotted and solid line positions of the latch member 55.

When, however, the clamping plate 48 is opened as shown in Figures 8 and 9, so that the film section is no longer clamped, then the latch member 55 may be moved further in a left hand direction for engaging the pin 58 of the latch member 57. When this is done, as shown in Figure 9, the latch member 57 is released from the latch surface 60 so that the pivoted base plate 45 may be raised. Thus, it is only possible to raise or open the pivoted base plate 45 after the pivoted clamping plate 48 has been raised or opened. This latch arrangement for the film holding assembly 18 therefore prevents opening of the same while the film section is clamped therein and thus prevents rupturing or breaking of the splice.

In the use of the film splicer the film section 64 is properly inserted in the film holding assembly 18 and the pivoted base plate 45 and the pivoted clamping plate 48 thereof latched together as illustrated in Figures 2 and 10 and the film section 25 is properly inserted in the film holding assembly 17 and the pivoted clamping member 22 thereof latched to the base plate 19 thereof as illustrated in Figure 2. The bracket 36 and the film scraper 37 are released from the headed pin 40 and moved to scraping position as illustrated in Figures 2, 3 and 5. The film section 25 is then scraped by manipulating the film scraper 37 for removing the emulsion therefrom. In this operation abrading or cutting through the film section 25 is entirely prevented, substantially only the emulsion being removed. After the scraping operation is completed, the bracket 36 and film scraper 37 are then returned to the inoperative position under the headed pin 40. A suitable solvent is then applied to the scraped portion of the film section 25. Then the latch plates 45 and 48 holding the film section 64 are closed and latched against the base 11. In so doing, the film of the film section 64 extending beyond the extension of the clamping plate 48 and the film of the film section 25 extending beyond the extension of the base plate 19 are automatically cut off. When the film holding section 18 is latched to the base 11, the edge of the film section 64 is brought into engagement with and pressed against the scraped and solvent treated edge of the film section 25 for adhesively securing the two film sections 25 and 64 together in a neat and narrow lap joint. In this way the two film sections 25 and 26 are simply spliced, the joint being extremely strong since the film section 25 has not been materially weakened by the scraping or abrading action. After the splice is so formed, then the pivoted clamping plates 22 and 48 are opened by manipulating the latch members 28 and 55 completely exposing the spliced film so that it may be readily removed. In this connection it is impossible to open the pivoted base plate 45 from the base 11 until after the pivoted clamping plate 48 is opened and, accordingly, breaking of the splice is thereby prevented.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. In a film splicer which includes a film holding assembly having a base plate and a clamping plate for clamping the film therebetween, the base plate extending beyond the clamping plate, and a support member on the clamping plate, a film scraper slidably mounted on said support member and overlying the base plate extension for movement transverse to the film and including a plurality of scraper blades for scraping the film and a pair of spacer feet for engaging the base plate extension to space the scraper blades therefrom to prevent the scraper blades from cutting through the film.

2. In a film splicer which includes a film holding assembly having a base plate and a clamping plate for clamping the film therebetween, the base plate extending beyond the clamping plate, and a support member on the clamping plate, a film scraper slidably mounted on said support member and overlying the base plate extension for movement transverse to the film and including a plurality of scraper blades for scraping the film and spacer means for engaging the base plate extension to space the scraper blades therefrom to prevent the scraper blades from cutting through the film.

3. In a film splicer which includes a film holding assembly having a base plate and a clamping plate for clamping the film therebetween and a support member, a film scraper mounted for longitudinal movement along said support member transverse to the film and including a plurality of scraper blades for scraping the film and spacer means for limiting the extent of scraping of the film by the scraper blades to prevent the scraper blades from cutting through the film.

4. In a film splicer which includes a base plate, means for clamping the film to the base plate and a support member, a film scraper mounted for longitudinal movement along said support member transverse to the film and including a plurality of scraper blades for scraping the film clamped to the base plate and spacer means for limiting the extent of scraping of the film by the scraper blades to prevent the scraper blades from cutting through the film.

5. In a film splicer which includes a base plate, means for clamping the film to the base plate and a support member, a film scraper mounted for longitudinal movement along said support member transverse to the film and including a plurality of scraper blades for scraping the film clamped to the base plate and spacer means for engaging the base plate to space the scraper blades therefrom to prevent the scraper blades from cutting through the film.

6. In a film splicer which includes a base plate, means for clamping the film to the base plate and a support member, a film scraper mounted for longitudinal movement along said support member transverse to the film and including a plurality of scraper blades for scraping the film clamped to the base plate and a pair of spacer feet for engaging the base plate to space the scraper blades therefrom to prevent the scraper blades from cutting through the film.

7. In a film splicer which includes a base, a pair of adjaent film holding assemblies carried by the base, the first film holding assembly including a pivoted clamping plate and a stationary base plate extending beyond the clamping plate for clamping a film section therebetween, the second film holding assembly including a pivoted base plate and a pivoted clamping plate extending beyond the base plate for clamping another film section therebetween, the extension of the pivoted clamping plate of the second film holding assembly overlying the extension of the stationary base plate of the first film holding assembly when the second film holding assembly is closed against the base, and the extension of the stationary base plate of the first film holding assembly being exposed when the second film holding assembly is opened from the base, a support pin carried by the pivoted clamping plate of the first film holding assembly, a film scraper pivotally and slidably mounted on the support pin and pivotally movable to a position overlying the extension of the stationary base plate and slidably movable transverse to the film section clamped by the first film holding assembly, said film scraper including a plurality of scraper blades for scraping the film section clamped by the first film holding assembly and spacer means for limiting the extent of scraping of the film by the scraper blades to prevent the scraper blades from cutting through the film section.

8. In a film splicer which includes a base, a pair of adjacent film holding assemblies carried by the base, the first film holding assembly including a pivoted clamping plate and a stationary base plate extending beyond the clamping plate for clamping a film section therebetween, the second film holding assembly including a pivoted base plate and a pivoted clamping plate extending beyond the base plate for clamping another film section therebetween, the extension of the pivoted clamping plate of the second film holding assembly overlying the extension of the stationary base plate of the first film holding assembly when the second film holding assembly is closed against the base, and the extension of the stationary base plate of the first film holding assembly being exposed when the second film holding assembly is opened from the base, a support pin carried by the pivoted clamping plate of the first film holding assembly, a film scraper pivotally and slidably mounted on the support pin and pivotally movable to a position overlying the extension of the stationary base plate and slidably movable transverse to the film section clamped by the first film holding assembly, said film scraper including a plurality of scraper blades for scraping the film section clamped by the first film holding assembly and spacer means for engaging the extension of the base plate of the first film holding assembly to space the scraper blades therefrom to prevent the scraper blades from cutting through the film section.

9. In a film splicer which includes a base, a pair of adjacent film holding assemblies carried by the base, the first film holding assembly including a pivoted clamping plate and a stationary base plate extending beyond the clamping plate for clamping a film section therebetween, the second film holding assembly including a pivoted base plate and a pivoted clamping plate extending beyond the base plate for clamping another film section therebetween, the extension of the pivoted clamping plate of the second film holding assembly overlying the extension of the stationary base plate of the first film holding assembly when the second film holding assembly is closed against the base, and the extension of the stationary base plate of the first film holding assembly being exposed when the second film holding assembly is opened from the base, a support pin carried by the pivoted clamping plate of the first film holding assembly, a film scraper pivotally and slidably mounted on a support pin and pivotally movable to a position overlying the extension of the stationary base plate and slidably movable transverse to the film section clamped by the first film holding assembly, said film scraper including a plurality of scraper blades for scraping the film section clamped by the first film holding assembly, latch means for releasably latching the pivoted clamping plate of the first film holding assembly to its stationary base plate, latch means carried by the pivoted base plate of the second film holding assembly for releasably latching the pivoted clamping plate of the second film holding assembly thereto, latch means carried by the pivoted base plate of the second film holding assembly for releasably latching the same to the base, and means inetrconnecting said two last mentioned latch means to permit releasing of the pivoted base plate from the base only after the pivoted clamping plate is released from the base plate.

10. In a film splicer which includes a base, a pair of adjacent film holding assemblies carried by the base, the first film holding assembly including a pivoted clamping plate and a stationary base plate extending beyond the clamping plate for clamping a film section therebetween, the second film holding assembly including a pivoted base plate and a pivoted clamping plate extending beyond the base plate for clamping another film section therebetween, the extension of the pivoted clamping plate of the second film holding assembly overlying the extension of the stationary base plate of the first film holding assembly when the second film holding assembly is closed against the base, and the extension of the stationary base plate of the first film holding assembly being exposed when the second film holding assembly is opened from the base, a support pin carried by the pivoted clamping plate of the first film holding assembly, a film scraper pivotally and slidably mounted on the support pin and pivotally movable to a position overlying the extension of the stationary base plate and slidably movable transverse to the film section clamped by the first film holding assembly, said film scraper including a plurality of scraper blades for scraping the film section clamped by the first film holding assembly, spacer means for limiting the extent of scraping of the film by the scraper blades to prevent the scraper blades from cutting through the film section, latch means for releasably latching the pivoted clamping plate of the first film holding assembly to its stationary base plate, latch means carried by the pivoted base plate of the second film holding assembly for releasably latching the pivoted clamping plate of the second film holding assembly thereto, latch means carried by the pivoted base plate of the second film holding assembly for releasably latching the same to the base, and means interconnecting said two last mentioned latch means to permit releasing of the pivoted base plate from the base only after the pivoted clamping plate is released from the base plate.

11. In a film splicer which includes a base, a film holding assembly having a base plate and a clamping plate for clamping a film therebetween, and means for pivoting the base plate and the clamping plate to the base, a first latch member carried by the base plate and extending through an opening in the clamping plate and engaging the clamping plate for releasably latching together the base plate and the clamping plate, the end of said first latch member being exposed for releasing the same from the clamping plate, a second latch member carried by the base plate and engaging a shoulder on the base for releasably latching together the base plate and the base, and interengaging means between the two latch members for operating the second latch member by the first latch member, the relationship between the interengaging means and the opening in the clamping plate being such that the opening prevents sufficient movement of the first latch member to operate the interengaging means to release the second latch member when the clamping plate is adjacent the base plate whereby opening of the base plate from the base is permitted only when the clamping plate is first opened from the base plate.

12. In a film splicer which includes a base, a film holding assembly having a base plate and a clamping plate for clamping a film therebetween, and means for pivoting the base plate and the clamping plate to the base, a first latch member carried by the base plate and extending through an opening in the clamping plate and engaging the clamping plate for releasably latching together the base plate and the clamping plate, the end of said first latch member being exposed for releasing the same from the clamping plate, a second latch member carried by the base plate and engaging a shoulder on the base for releasably latching together the base plate and the base, and interengaging means between the two latch members for operating the second latch member by the first latch member, the relationship between the interengaging means and the opening in the clamping plate being such that the opening prevents sufficient movement of the first latch member to operate the inetrengaging means to release the second latch member when the clamping plate is adjacent the base plate whereby opening of the base plate from the base is permitted only when the clamping plate is first opened from the base plate, and a spring connected between the two latch members for resiliently holding the latch members in latching positions.

13. In a film splicer which includes a base, a film holding assembly having a base plate and a clamping plate for clamping a film therebetween, and means for pivoting the base plate and the clamping plate to the base, latch means carried by the pivoted base plate for releasably latching the pivoted clamping plate to the pivoted base plate, latch means carried by the pivoted base plate for releasably latching the pivoted base plate to the base, and means interconnecting said two last mentioned latch means to permit releasing of the pivoted base plate from the base only after the pivoted clamping plate is released from the pivoted base plate.

UNITED STATES PATENTS
References Cited in the file of this patent

| | | |
|---|---|---|
| 2,385,353 | Frankel | Sept. 25, 1945 |
| 2,457,995 | Frankel | Jan. 4, 1949 |
| 2,495,957 | Corsaw | Jan. 31, 1950 |
| 2,611,724 | Wittenberg | Sept. 23, 1952 |